United States Patent [19]
Tadakuma et al.

[11] 4,138,733
[45] Feb. 6, 1979

[54] ELECTRONIC CASH REGISTER

[75] Inventors: Yuji Tadakuma; Syunji Saito; Toru Eguchi, all of Ohito, Japan

[73] Assignee: Tokyo Electric Co., Ltd., Tokyo, Japan

[21] Appl. No.: 801,327

[22] Filed: May 27, 1977

[30] Foreign Application Priority Data

May 28, 1976 [JP] Japan .................. 51-62022

[51] Int. Cl.$^2$ .............. G07G 1/00; G06F 3/02; G06F 15/20
[52] U.S. Cl. ...................... 364/900; 235/2; 235/7 R
[58] Field of Search .............. 364/900 MS File; 235/2 R, 7 R

[56] References Cited

U.S. PATENT DOCUMENTS

| 3,909,604 | 9/1975 | Monna | 235/152 |
| 3,924,108 | 12/1975 | Nakamura | 235/152 |
| 4,003,030 | 1/1977 | Takagi et al. | 340/172.5 |
| 4,027,140 | 5/1977 | Fowler et al. | 235/7 R |
| 4,084,238 | 4/1978 | Masuo | 364/900 |

Primary Examiner—Gareth D. Shaw
Assistant Examiner—C. T. Bartz
Attorney, Agent, or Firm—Flynn & Frishauf

[57] ABSTRACT

An electronic cash register comprises: a keyboard including a group of entry keys for entering input data representing the price of a merchandise item; a read only memory; a memory section including an entry data memory for temporarily storing the input data, a counter for counting number of the digits of the input data and a totalizer for accumulating the input data; a central processor unit coupled to the keyboard, the read only memory, the digit number counter, and the memory section; and prohibiting means for prohibiting registration of a specific input data with a digit number larger than a predetermined one. The keyboard further includes at least a release key for releasing the registration prohibition for such specific input data and the cash register further includes means for permitting at least one of the specific input data to be registered when the release key is actuated.

2 Claims, 8 Drawing Figures

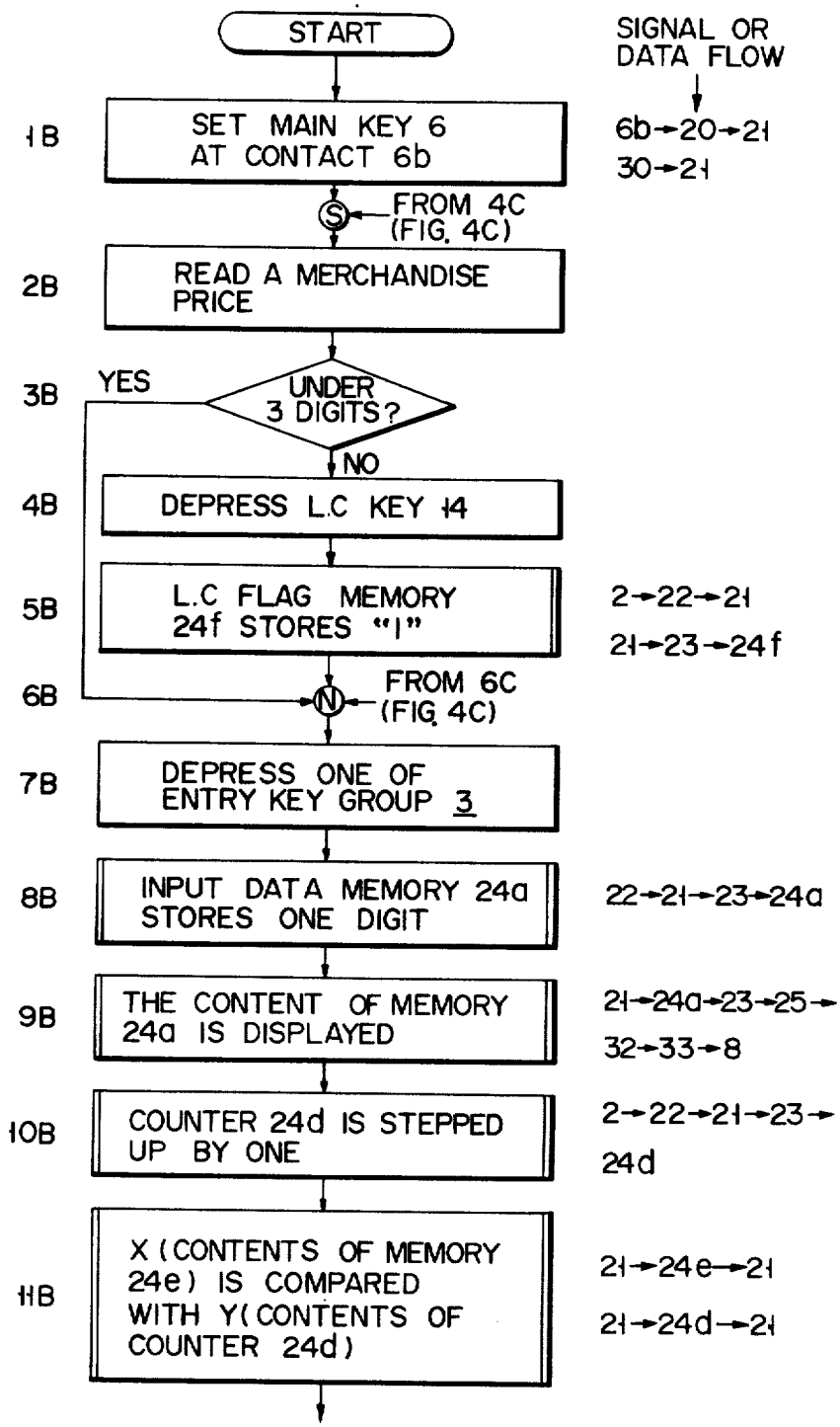

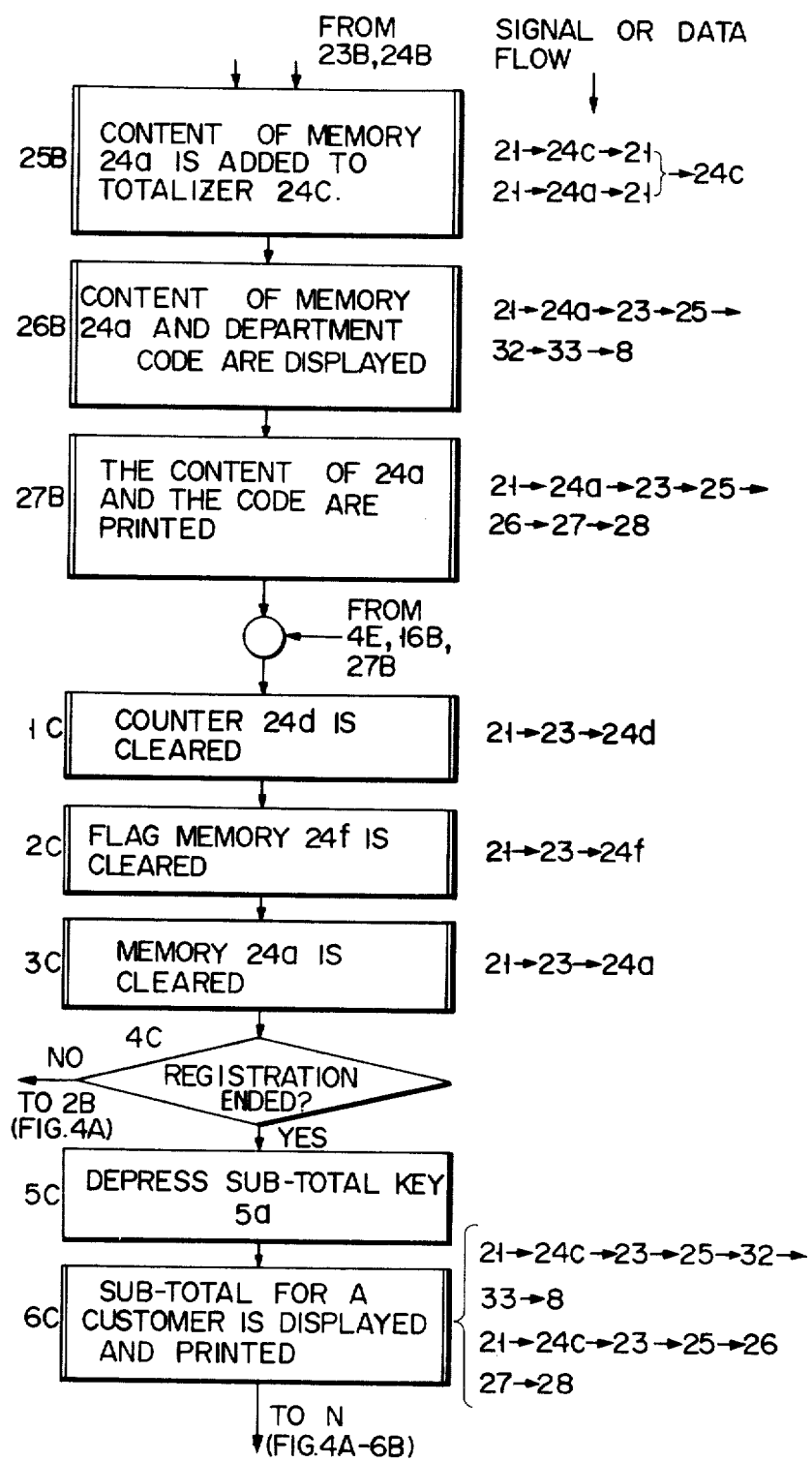

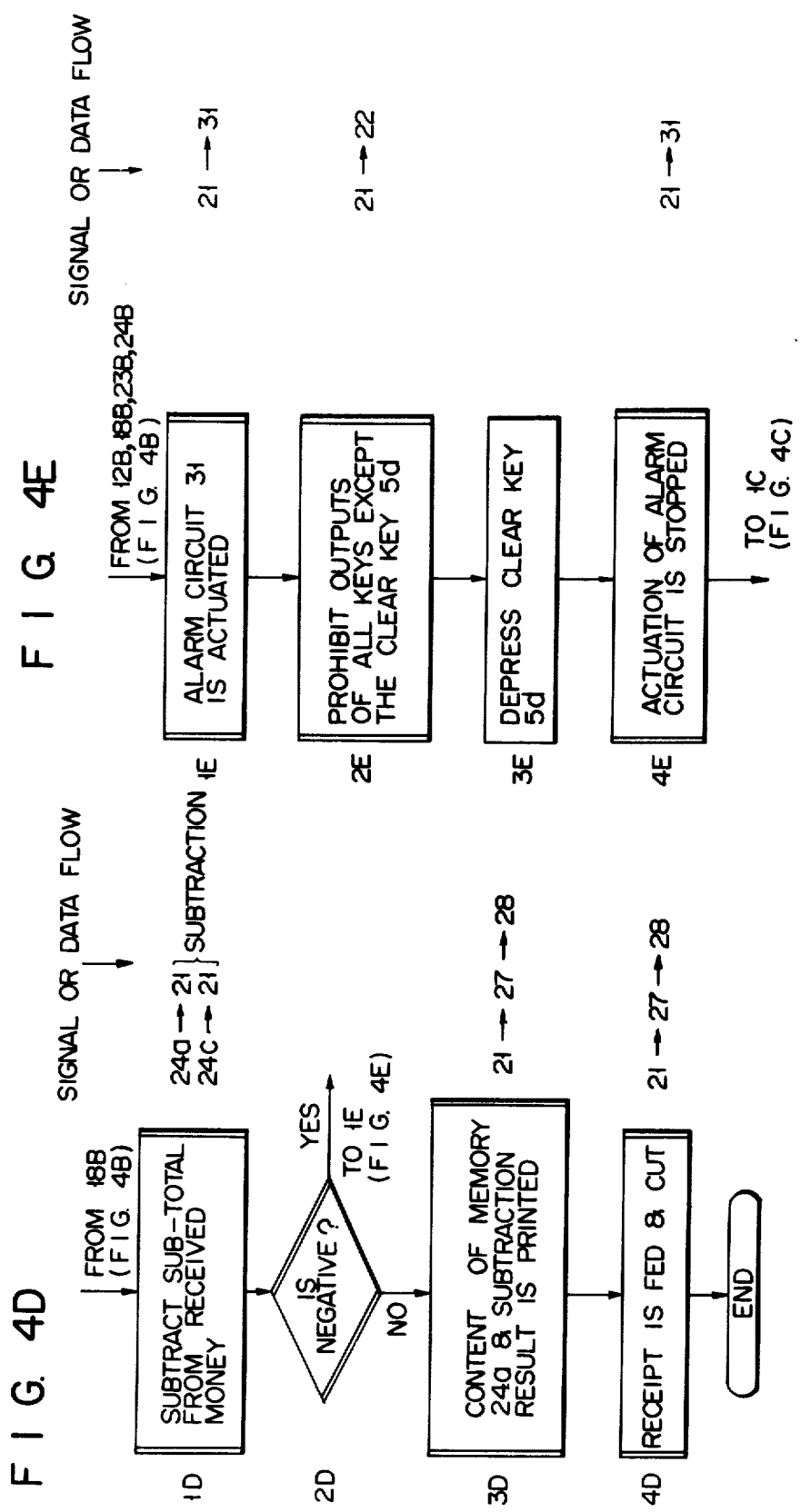

ELECTRONIC CASH REGISTER

BACKGROUND OF THE INVENTION

The present invention relates to an electronic cash register and, more particularly, to one in which, when number of the digits of input data representing the price of a merchandise item sold is larger than a predetermined one, prohibition of the registration of such data is temporarily released, permitting such data to be registered.

Generally, an electronic cash register (hereinafter often referred to merely as ECR) has placed a limit on the digit number of the input data representing the price of a merchandise item. For example, if the maximum digit number of the input data permitted to be registered into the ECR is six digits, the digit number to be registered through one registration operation is sometimes limited to three digits. In this specification, the term "registration" means that the input data is temporarily loaded into an entry memory to be described later and, through depression of a department key, for example, of the function keys on the keyboard, the input data loaded are printed on the receipt paper while at the same time they are added to the total in the totalizer. When two merchandise items each having the price of three digits are successively registered, if a given key operation, e.g. depression of a department key, is missed between the registration operation of the merchandise price, a single merchandise item with six digits is apparently registered. It is for this reason that the digit number of the input data to be registered into the ECR is limited. Accordingly, if about 95% of all the merchandise to be treated have prices with the digit number less than three digits, the ECR is preset to have three digits as the maximum digit number of the price for registration. The presetting may previously be made to a memory section of the ECR. When a price with more than three digits is registered, an operator must divide the price into ones each having digits equal to or less than three digits and repeat the ordinary registration operations for the respective divided ones. Such a registration operation is troublesome, thus tending to give rise to errors. Additionally, since the number of the registration operations is not coincident with that of the merchandise items sold, the customer is sometimes perplexed.

Accordingly, the primary object of the present invention is to provide an electronic cash register permitting the registration of input data with more than a predetermined number of digits, with provision of means for temporarily releasing the registration prohibition of the input data with such a number of digits.

SUMMARY OF THE INVENTION

A cash register according to the present invention comprises: a central processor; keyboard coupled to the central processor and including a group of entry keys for entering input data representing the price of a merchandise item and a group of function keys for processing the input data; a read only memory coupled to the central processor for storing a number of programs; a memory section coupled to the central processor and including an input data memory for temporarily storing the input data, a counter for counting the number of digits of the input data, a low digit number memory for storing a value corresponding to a first predetermined number of digits and a totalizer for totalizing the input data; printing means coupled to the central processor and to the memory section for printing the data stored in the input data memory and the total of the input data in the totalizer on a printing paper; and first means coupled to the counter and to the low digit number memory for prohibiting the registration of a specific input data formed of digits exceeding the first predetermined number of digits. The keyboard further comprises registering means including at least a release key for permitting the registration of at least one specific input data item formed of digits exceeding the first predetermined number of digits. The cash register further includes means for permitting such a specific input data item to be registered only during the period of time for the registration of that data item, when the release key is actuated.

With such a construction, input data formed of digits exceeding the predetermined number of digits may be registered in a single registration operation. Consequently, erroneous registration is prevented and the number of registrations of merchandise items prices coincides with that of the registrations of merchandise items sold.

Other objects and features of the present invention will be apparent from the following description taken in connection with the accompanying drawings.

BRIEF DESCRIPTION OF THE DRAWING

FIGS. 4A to 4E show flow charts for explaining in detail the operation of the cash register of the invention.

DETAILED DESCRIPTION OF THE PREFERRED EMBODIMENT

Figure 1:
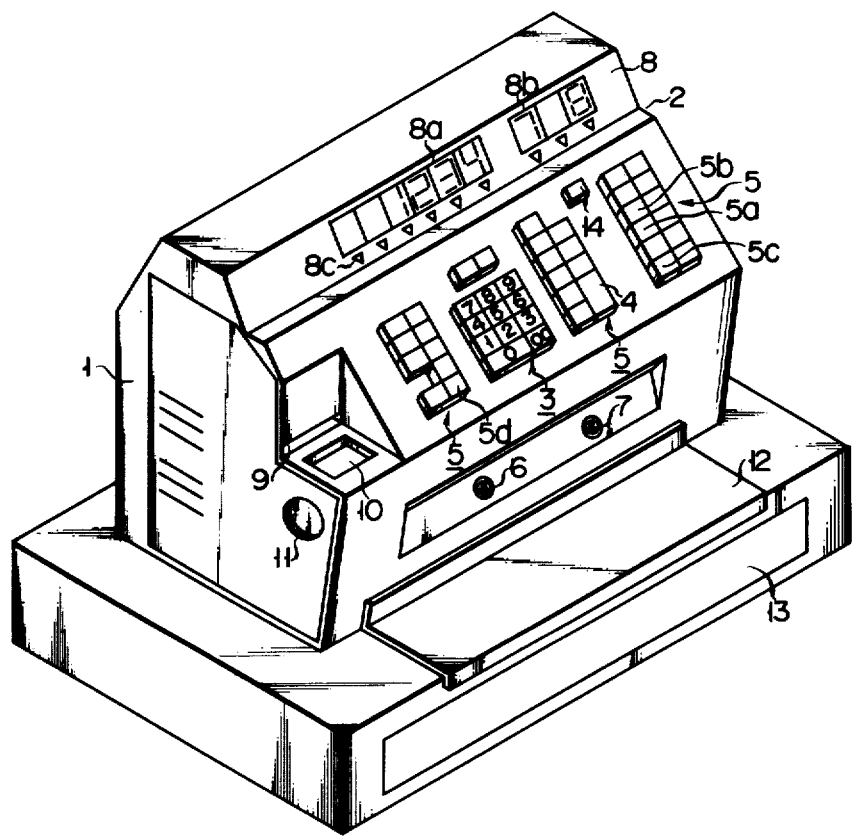
FIG. 1 shows a perspective view of an embodiment of an electronic cash register according to the present invention.

Reference will now be made to FIG. 1 illustrating an electronic cash register of the invention. As shown, a keyboard 2 is provided on the front panel of a casing 1. The keyboard 2 is furnished with a group of entry keys 3 for entering input data representative of the prices of merchandise and others, and a function key group 5 for processing the input data fed through the entry keys 3. In this specification, the function key group 5 includes a key or keys other than the entry keys 3 such as a department key 4 for entering the department to which the merchandise sold belongs, and a listing capacity extension key 14 to be described later which is used for releasing the limitation to the number of digits of the input data to be registered. For easy of explanation, keys essential to the invention such as a sub-total key 5a, a number (#) key 5b, a balance due/cash tend key 5c, and a clear key 5d will be referred to in this specification, with omission of the names and functions of other keys. The casing 1 is provided at the front with a main key 6 and a clerk key 7. Further, a display section 8 is placed on the front of the casing 1. The display section 8 includes a display window 8a for displaying the price of a merchandise item, a display window 8b for displaying the department of the merchandise item, and another display window 8c for displaying the processing contents which is now executed in the ECR. The casing 1 further includes a receipt outlet 9, a monitoring window 10 for monitoring the printing contents of a recording paper, for example, the journal paper, an access opening for manually feeding the receipt and the journal paper, a cash table 12, and a drawer 13.

Figure 2:
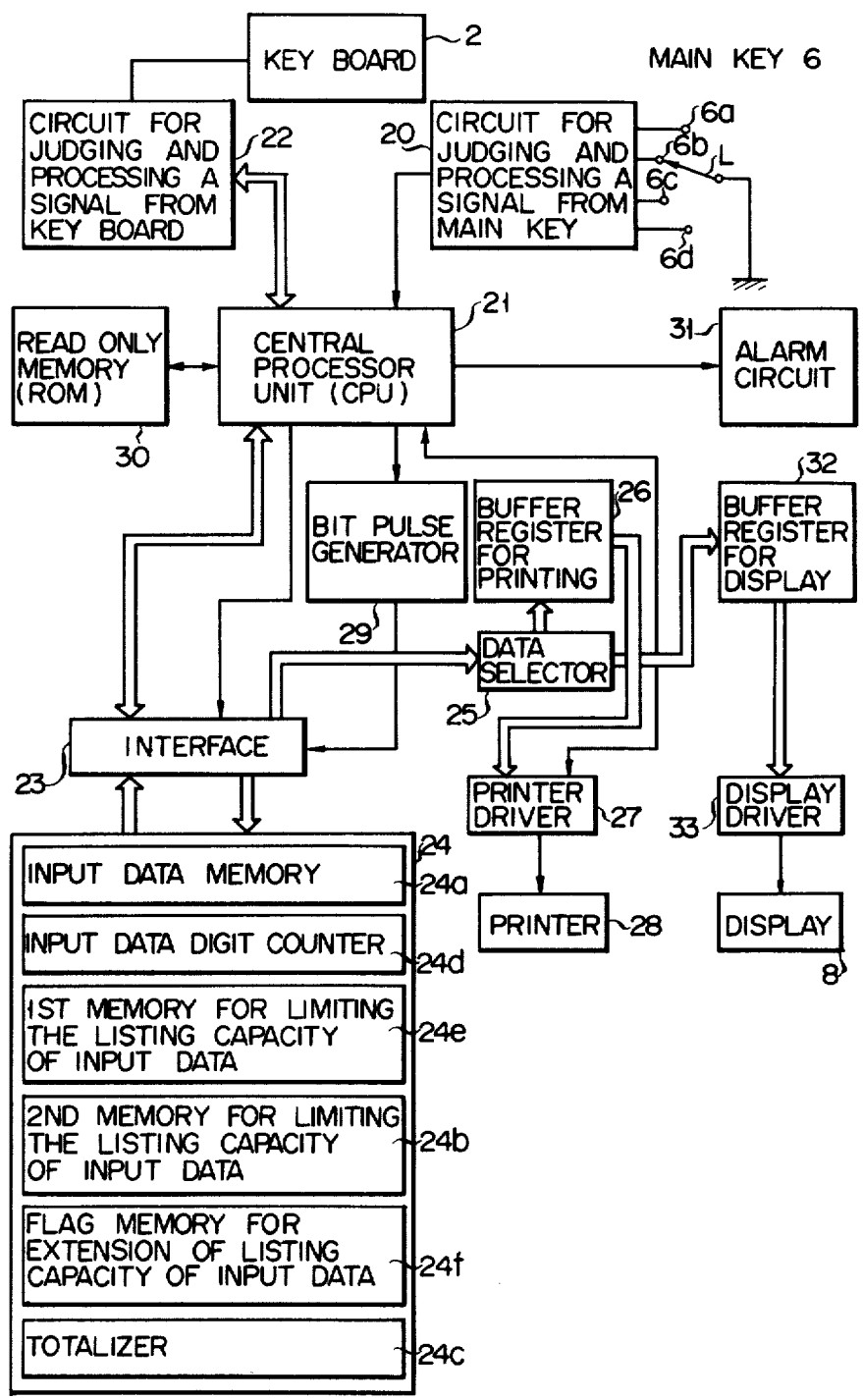
FIG. 2 shows a wiring block diagram of the electronic cash register shown in FIG. 1.

As shown in FIG. 2, the lever L of the main key 6 rotates to successively contact respective contacts 6a, 6b, 6c and 6d. When the lever L contacts the contact 6a, the power is shut off. Its contact with the contact 6b permits the ECR to execute the registration task. Its contact with the contact 6c permits the ECR to execute an inspection task. The lever further rotates to contact the contact 6d and, at this time, a clearing task is executed. Information from the main key 6 is fed to a circuit for judging and processing a signal from main key 20 and information entered by the keyboard 2 is fed to a circuit for judging and processing a signal from keyboard 22. A central processing unit 21 receives output signals of the circuits 20 and 22 and also transmits necessary signals to the circuit 22. The central processing unit 21 will be abbreviated merely as CPU. A read only memory (ROM) 30 connected to the CPU 21 includes a number of programs fixed or permanently stored therein. The ROM 30 is connected to the CPU 21 such that it delivers necessary programmed information to the CPU in response to an appropriate read-out signal from the CPU. A memory section 24 includes various memories 24a to 24f. The memory 24a to be called an input data memory is used for temporarily storing the input data entered by the entry key group 3. The memory 24d to be called an input data digit counter counts the digit number of the input data and stores it. The memory 24e is a first memory for limiting the listing capacity of input data and stores the limited digit number, for example, 6 digits, of the input data, which the limited digit number is previously preset in the ECR. The memory 24b is a memory for limiting the listing capacity of input data and stores a given digit number, for example, 3 digits, of input data to which the maximum digit number thereof at an ordinary registration is limited. The memory 24f is a flag memory for extending the listing capacity of input data and store "1" when the listing capacity extension key 14 is depressed and is cleared when the department key 4 is depressed. The memory 24c of represents a totalizer for accumulating the input data. The memory 24c may include totalizers for the respective departments of merchandise items, the respective customers and the like. The memory section 24 is coupled with the CPU through an interface 23. A printer unit is comprised of a data selector 25, a buffer register 26, a printer driver 27 and a printer 28. The printer unit is coupled with the memory section 24 through the interface 23 and the printer driver 27 is connected to the CPU 21. The data selector 25 selects or judges whether incoming data is one to be transmitted to the display unit or one to be printed in the printer unit. The display unit includes a buffer register 32, a display driver 33 and a display 8. A bit pulse generator 29 is coupled between the CPU 21 and the interface 23. The generator 29 times data transferred to the memory section 24 and data transferred from the memory section 24 to the data selector 25. An alarm circuit 31 is coupled with the CPU 21. The alarm circuit 31 gives an alarm when the digit number of the input data by the entry key group 3 is larger than that stored in the second memory 24b.

In this specification, the term "registration" task is that task whereby the price of the merchandise sold is stored into the input data memory 24a through the actuation of the entry keys 3 and, through the actuation of the department key 4, the input data representative of the price stored in the memory 24a is printed on the receipt paper and the journal paper while at the same time the input data is added to the total of sales stored in the corresponding totalizers 24c which is the selected one of the plurality of totalizers 24c. The term "inspection" task is to print on the journal paper the totals of the respective totalizers 24c and the total number of merchandise sold. The term "clear" task is to print on the journal paper the total number of merchandise items sold and the totals of sales in the respective totalizers 24c when a day's work is completed, and to clear them of the totalizers.

In this example, a single listing capacity extension key 14 is used. When the extension key is depressed, even if the digit number of the input data entered by actuation of the entry keys 3 is larger than the limited digit number, for example larger than three digits, such an input data with large digit number may be registered only one time. After the one time registration and depression of the department key 4, the listing capacity limiting function for limiting the digit number to three digits is restored. In other words, upon depression of the listing capacity extension key 14, the cash register permits the input data with digit number equal to the permissible maximum one, for example 6 digits, of the cash register per se to be registered thereinto only one time. Then, the cash register prohibits the registration of such data, permitting the registration of input data with a normal number of digits, for example 3 digits. If it is desired to register successively two times an input data item with excessive number of digits, the extension key 14 must be depressed two times successively. Note here that two keys for listing capacity extension may be employed; one for releasing the listing capacity limiting function of one time registration and the other one for releasing that of successive two times registrations.

The operation of the cash register of the invention will be described in detail with reference to FIGS. 1 and 2. Assume now that the first memory 24e for limiting the listing capacity of input data stores six digits and the second memory 24b for limiting the same stores three digits. The lever L of the main key 6 is first made to contact with the contact 6b. Upon the actuation of the key 6, the circuit 20 produces an output signal to place the CPU in the registration condition. The entry keys 3 on the keyboard 2 are actuated to enter the price (three digits at maximum) of a merchandise item sold into the cash register. The input data entered is temporarily stored in the input data memory 24a through the circuit 22, the CPU 21 and the interface 23. The digit number of the input data stored in the memory 24a is counted by the input data digit counter 24d. Unlike this example, the counter 24d may be provided in the CPU. The CPU also includes a comparator (not shown) for comparing the digit number of the input data, i.e. the digit number counted by the counter 24d, with the digit number stored in the second memory 24b. When the CPU judges that the digit number in the input data memory is not larger than that stored in the second memory 24b, the input data in the input data memory 24a, in response to depression of the department key 4, is added to the data in the totalizer 24c and the result of the addition is again memorized in the totalizer 24c. At the same time, the data in the memory 24a is transferred to the printer driver 27 through the interface 23, the data selector 25 and the buffer register 26. Then, by the printer 28, the data is printed on the receipt paper and the journal paper under the control of the CPU. The data also is displayed on the display 8 to which it is fed through the data selector 25, the buffer register 32 and the display driver 33.

Conversely, when the comparator included in the CPU 21 judges that the digit number of the data in the input data memory 24a exceeds three digits, the CPU delivers an alarm signal to the alarm circuit 31 to drive a buzzer, for example. At the same time, the registration of the input data having more than three digits is prohibited. In other words, even if the department key 4 is depressed, the data in the input data memory 24a is not added to the total in the totalizer 24c and no data is delivered to the data selector 25. At this time of alarm, an operator must depress the clear key 5d to clear the input data memory 24a.

In the above mentioned case, the listing capacity extension key 14 must be depressed. Upon depression of the key 14, the signal from the key 14 is delivered by way of the CPU 21 and the interface 23 to load the binary "1" into the flag memory 24f in the memory section 24. After the depression of the key 14, the data with such excessive number of digits is inputted into the register. The data inputted is memorized in the input data memory 24a without any disturbance. Under this condition, since the binary "1" is stored in the flag memory 24f, the digit number of the input data is not compared with that, i.e. three digits, in the second memory 24b. Therefore, the input data is added to the accumulated data in the totalizer 24c and is then transferred to the printing means for printing and at the same time to the display unit for displaying. When the registration of the input data with the large digit number is completed, the flag memory 24f is cleared and the listing capacity limiting function is restored. Therefore, when one desires to register again such type of data into the cash register, the listing capacity extension key 14 must be depressed again. The first memory 24e is used for prohibiting the registration of input data with more than six digits, even if the key 14 is depressed.

The operation mentioned above is performed through proper operations of the programs stored in the read only memory, the memorizing conditions in the respective memories in the memory section 24 and the CPU 21.

Figure 3:
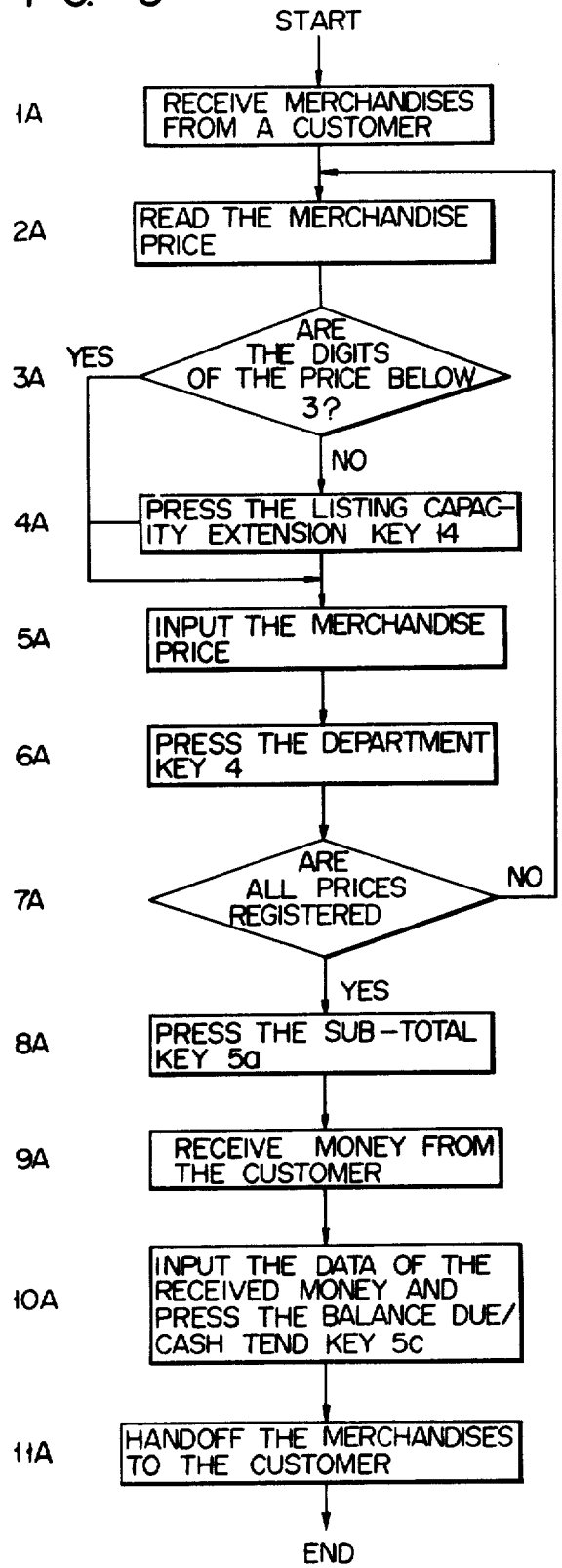
FIG. 3 is a flow chart useful in explaining the operation of the circuit shown in FIG. 2.

Referring now to FIG. 3, there is shown a brief flow chart illustrating the operation of the cash register of the invention for the operator. At 1A step, an operator receives a single or a plurality of merchandise items from a customer. At 2A step, the operator reads the price of the merchandise. At 3A step, check is made to see whether the digits of the price is below three or not. If it is below three (YES), the merchandise price is inputted by the keys 3. See step 5A. If it is not below 3 digits (NO), the operator depresses the listing capacity extension key 14 at step 4A, and then the data with digits above 3 are inputted at step 5A. Following this, the department key 4 is depressed (step 6A). The registration operation is made for all the merchandise items sold. See step 7A. After registration of all items of merchandise, the sub-total key 5a is pressed down. See step 8A. At step 9A, the operator receives money from the customer. If the operator receives more money than the sub-total, the operator inputs by the keys 3 data corresponding to the amount of the received money and then presses down the BALANCE DUE/CASH TEND KEY 5c at step 10A. Then, the operator hands off the merchandise to the customer together with change (see step 11A).

Figure 4B:
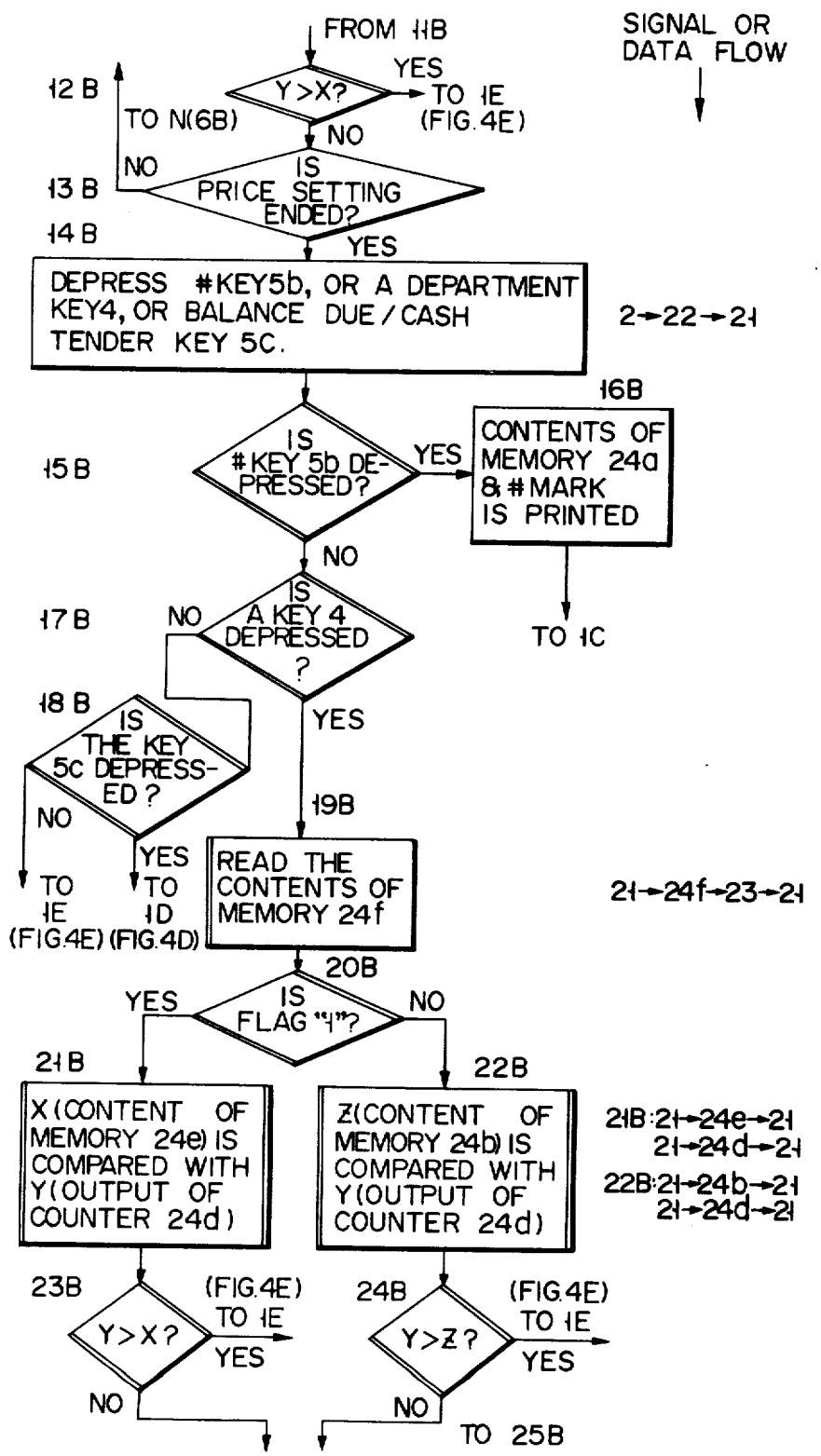

More detailed flow charts are shown in FIGS. 4A to 4F. The main key 6 is set at the "registration" position at step 1B. The operator, or cashier, reads a merchandise price at step 2B. If the price of the merchandise is below 3 digits (YES), the price data is inputted at step 7B. If it is above 3 digits, the cashier, depresses the listing capacitor extension key (hereinafter abbreviated often as LC key) 14. See step 4B. In response to the depression of the key 14, the binary bit "1" is stored in the flag memory 24f. See step 5B. The price data is inputted digit by digit by depressing one of the entry keys 3 at step 7B. The input data is stored in the input data memory 24a (step 8B) while at the same time displayed (step 9B). The counter 24d is stepped up digit by digit at step 10B whereby the price data is inputted. At step 11B, the comparator (not shown) of the CPU 21 compares X contents, for example, of 6 digits of the first memory 24e with Y contents of the counter 24d. The comparison is made every time each digit of the input data is inputted. If the comparator shows Y > X (YES), the alarm circuit 31 operates as shown in FIG. 4E (step 1E) and the key signals except the clear key 5D signal are prohibited. At this time, the cashier depresses the clear key 5d to stop the drive of the alarm circuit 31 (step 3E). On the other hand, if Y < X (NO), the price data are completely inputted (13B), the number (#) key 5b or the department key 4 or the balance due/cash key 5c is depressed (14B). When the number key 5b is pressed down (15B), the contents of the input data memory 24a and the # mark are printed on the receipt paper, and the contents of the counter 24d is cleared (16B). When the department key 4 is pressed down (17B), the contents of the flag memory 24f is read out to the CPU 21 to see whether it is "1" or "0". See step 20B. If the contents is "1", the contents X of the counter 24e is compared with that Y of the counter 24 in the CPU 21 (21B). If Y > X, an alarm is issued, as mentioned above. If the flag memory 24f stores "0" (20B-NO), the contents Z of the second memory 24b is compared with that Y of the counter 24d in the CPU 21. See step 22B. If Y > Z, the alarm is given as mentioned above. If the relations between Y and X, and Y and Z are not Y > X and Y > Z (steps 23B, 24B; NO), the contents of the input data memory 24a is accumulated in the totalizer 24c (step 25B), and the contents of the input data memory 24a and its department are displayed (step 26B). Then, the contents of the memory 24a and the department code are printed (step 27B). Succeedingly, the contents of the input data digit counter 24d is cleared (step 1C), and then the flag memory 24f and the memory 24 are cleared (steps 2C) and (3C). In this way, the registration of the price of a single merchandise item is completed. If the prices of other merchandise items must be registered (step 4C-YES), the operation is returned to step 2B of FIG. 4A and operations from the step 2B of FIG. 4A to step of FIG. 4C will be repeated. When the registration operations of all the merchandise items are ended (step 4C-YES), the sub-total key 5c is depressed and the sub-total of all the merchandise items bought by one customer is printed and displayed (step 6C).

After completion of the price registration of one customer, the registration operation returns to that shown in FIG. 4A (step 6B). Then, change is calculated for the money received from the customer in relation to the subtotal of the merchandise bought by the customer. See step 17B-NO and step 18B-YES in FIG. 4B and FIG. 4D. The explanation of the change calculation is omitted here because it is not essential to the present invention.

Other modifications of the disclosed embodiment will become apparent to those persons skilled in the art without departing from the spirit and scope of the invention as defined by the appended claims.

What we claim is:

1. In an electronic cash register having a central processor; a keyboard coupled to the central processor, the keyboard including a group of entry keys for entering input data representing the price of a merchandise item and a group of function keys for processing the input data; a read only memory coupled to the central processor for storing a number of programs; a memory section coupled to the central processor, the memory section including an input data memory for temporarily storing the input data, a low digit number memory having a value corresponding to a first predetermined number of digits stored therein, a counter for counting the digits of an input data item and a totalizer for accumulating the input data; a first prohibiting means coupled to the counter and to the low number memory for prohibiting the registration of an input data item formed of digits exceeding the first predetermined number of digits, by comparing the count of the counter with the value corresponding to the first predetermined number of digits stored in the low digit number memory; and printing means coupled to the central processor and to the memory section for printing on a printing paper the input data stored in the input data memory and the total of the input data accumulated in the totalizer;

the improvement:
wherein said electronic cash register further includes registering means for permitting the registration of at least one of specific input data item formed of digits exceeding said first predetermined number of digits, said registering means including a release key provided on said keyboard;

and further comprising:

a high digit number memory provided in said memory section and having stored therein a value corresponding to a second predetermined number of digits larger than the first predetermined number;

means coupled to the first prohibiting means for releasing said first prohibiting means when the release key is actuated; and a second prohibiting means coupled to the counter and to the high digit number memory for prohibiting the registration of the specific input data formed of digits exceeding the second predetermined number of digits, by comparing the count of the counter with the value corresponding to the second predetermined number of digits stored in the high digit number memory, thereby permitting at least one of the specific input data items formed of digits exceeding the first predetermined number of digits but not exceeding the second predetermined number of digits to be registered after the release key is actuated.

2. An electronic cash register according to claim 1, wherein an alarm circuit is further provided which generates an alarm signal when the number of digits of an input data item exceeds the first predetermined number of digits, thereby enabling an operator to actuate said release key for registering said input data item formed of digits exceeding the first predetermined number of digits.

* * * * *